United States Patent
Osipkov (10) Patent No.: US 10,360,385 B2
(45) Date of Patent: Jul. 23, 2019

(54) VISUAL STYLES FOR TRUST CATEGORIES OF MESSAGES

(75) Inventor: Ivan Osipkov, Bellevue, WA (US)

(73) Assignee: Microsoft Technology Licensing LLC, Redmond, WA (US)

( * ) Notice: Subject to any disclaimer, the term of this patent is extended or adjusted under 35 U.S.C. 154(b) by 578 days.

(21) Appl. No.: 13/053,431

(22) Filed: Mar. 22, 2011

(65) Prior Publication Data

US 2012/0246725 A1  Sep. 27, 2012

(51) Int. Cl.
*H04L 29/06* (2006.01)
*G06F 21/57* (2013.01)
*H04L 12/58* (2006.01)

(52) U.S. Cl.
CPC ............ *G06F 21/572* (2013.01); *H04L 51/12* (2013.01); *H04L 63/12* (2013.01); *H04L 51/22* (2013.01)

(58) Field of Classification Search
CPC ......... H04L 51/12; H04L 51/22; H04L 51/26; H04L 12/585; H04L 63/12; G06Q 10/107; G06F 21/572
USPC .......................................................... 726/23
See application file for complete search history.

(56) References Cited

U.S. PATENT DOCUMENTS

| | | | |
|---|---|---|---|
| 6,324,569 B1* | 11/2001 | Ogilvie et al. | 709/206 |
| 7,413,085 B2 | 8/2008 | Zager et al. | |
| 7,457,955 B2 | 11/2008 | Seshadri et al. | |
| 7,610,341 B2 | 10/2009 | Daniell | |
| 7,849,213 B1* | 12/2010 | Borghetti | 709/238 |
| 2003/0126300 A1* | 7/2003 | Pickover et al. | 709/310 |
| 2004/0078447 A1* | 4/2004 | Malik et al. | 709/206 |
| 2005/0267944 A1* | 12/2005 | Little, II | 709/207 |
| 2006/0206713 A1* | 9/2006 | Hickman et al. | 713/176 |

(Continued)

FOREIGN PATENT DOCUMENTS

| | | |
|---|---|---|
| CN | 1691039 A | 11/2005 |
| CN | 1868190 A | 11/2006 |

OTHER PUBLICATIONS

"MailWasher", Retrieved at << http://www.mailwasher.net/ >>, Retrieved Date : Nov. 3, 2010, pp. 3.

(Continued)

*Primary Examiner* — Yogesh Paliwal
(74) *Attorney, Agent, or Firm* — Buckley, Maschoff & Talwalkar LLC (57) ABSTRACT

A message queue (e.g., an email mailbox) may comprise messages received from various sources and including various types of content. For respective messages, a trust category may be identified, e.g., a trusted message category comprising messages received from a known source, an untrusted message category comprising messages received from an unverified source, and a suspicious message category comprising messages containing potentially malicious attachments or potentially unwanted content. The message queue may be presented to the user with the messages of each trust category having a visual style that visually distinguishes the trust categories; e.g., trusted messages may be visually emphasized, and suspicious messages may be visually de-emphasized. This manner of distinguishing messages may enable the user to triage the messages of the message queue, and may mitigate the disadvantages of a false positive in the trust level identification (as compared with moving the suspicious message to a different folder).

20 Claims, 8 Drawing Sheets

(56) References Cited

U.S. PATENT DOCUMENTS

2006/0230117 A1* 10/2006 Gross et al. ............... 709/207
2007/0005702 A1   1/2007 Tokuda et al.
2007/0156886 A1*  7/2007 Srivastava ................. 709/224
2008/0086695 A1   4/2008 Oral
2008/0126951 A1*  5/2008 Sood et al. ................ 715/752
2009/0234865 A1*  9/2009 Gillum et al. ............. 707/100

OTHER PUBLICATIONS

"Categorize Emails and Identify Sender using different Colors in Outlook", Retrieved at << http://www.askstudent.com/techtips/categorize-emails-and-identify-sender-using-different-colors-in-outlook/ >>, Retrieved Date: Nov. 3, 2010, pp. 7.

"Using Sender Colors to Manage Your Email", Retrieved at << http://www-10.lotus.com/ldd/notestipsblog.nsf/dx/using-sender-colors-to-manage-your-email >>, Retrieved Date: Nov. 3, 2010, pp. 2.

"First Office Action and Search Report Issued in Chinese Patent Application No. 201210077642.2", dated Mar. 2, 2016, 16 Pages.

"Second Office Action and Search Report Issued in Chinese Patent Application No. 201210077642.2", dated Oct. 18, 2016, 19 Pages.

"Third Office Action Issued in Chinese Application No. 201210077642.2", dated Apr. 19, 2017, 6 Pages.

* cited by examiner

VISUAL STYLES FOR TRUST CATEGORIES OF MESSAGES

BACKGROUND

Within the field of computing, many scenarios involve a presentation of messages in a message queue, such as a set of email messages presented in an email client, a set of private messages sent to a user in a web forum, or a set of chat messages received by various other users in a chat environment. In such scenarios, some messages may present undesired content, such as bulk unsolicited messages ("spam"); advertisements for goods or services that are illegal, illegitimate, or simply irrelevant to the user; objectionable material; malicious content, such as attachments or links to maliciously crafted software; and "phishing" attempts that impersonate a trusted individual in order to exploit the trust of the user.

Various techniques may utilized to evaluate the messages in order to identify whether the such messages are desirable or undesirable, such as a verification of the sender of the message, a semantic evaluation of the content of the message, and an evaluation of any links or software included in the message for malicious content. Messages identified as unwanted may be automatically deleted, partitioned (e.g., moving such messages to a "spam" folder), or otherwise filtered out of the message queue. Such filtering techniques are carefully formulated to reduce the incidence of false positives, wherein a legitimate message is incorrectly identified as an unwanted message and filtered out of the message queue, thereby resulting in a missed message that the user may have desired to have included in the message queue.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

With the rising prevalence of unwanted messages (e.g., the proliferation of "spam" and messages attaching or linking to maliciously crafted software), the evaluation of messages to identify and filter out unwanted messages presents a significant advantage over unfiltered message queues. However, while the accuracy of such identification techniques continues to improve, the development of error-free filtering techniques is unlikely, given the variety of content that may be included in messages that the user may desire to receive, and a false positive result may represent a significant detriment to the user.

The decision of whether to present a message to the user or exclude the message from the message queue may represent a coarse granularity in such evaluation techniques, particularly for borderline messages for which a determination is difficult to achieve with high confidence. However, it may be desirable to include an intermediate filtering option for such messages, whereby the message is presented to the user in the message queue, but is de-emphasized with respect to other messages. Conversely, for messages that are identified as wanted by the user (and particularly for messages of verifiable desirability and/or high priority to the user), it may be desirable to emphasize such messages with respect to other messages in the presentation of the message queue to the user.

In view of these considerations, the techniques presented herein relate to the presentation to a user of a message queue comprising a set of messages to be delivered to the user. In accordance with these techniques, a trust category set may be defined, comprising a set of trust categories that represent the confidence that the user wishes to receive the message. For example, the trust category set may include a trusted message category representing messages having a high confidence of desirability by the user (e.g., messages received from senders included in an address book of the user, from verified retailers with whom the user has conducted business, or including keywords of high interest to the user); a suspicious message category representing messages that are likely to be unwanted by the user (e.g., messages that appear to be bulk unsolicited offers for products or services or scams); and an untrusted message category representing messages that the user may or may not wish to receive. The messages of the message queue may be evaluated and identified with one of these trust categories. Moreover, a visual style may be selected for each trust category that visually distinguishes messages of the trust category from other messages in the message queue, and the message queue may be presented to the user with respective messages presented according to the visual style of the associated trust category. For example, messages identified within a trusted message category may be visually emphasized with a larger or heavier-weight font or an attention-attracting font color or shading, while messages identified within a suspicious message category may be visually de-emphasized with a smaller or lighter-weight font or with an attention-repelling font color or shading. In this manner, the visual styles of the messages may allow the user to triage the messages of the message queue in a rapid and easily understandable manner.

This presentation may be advantageous because the message queue may include messages having a wide range of trust levels (including suspicious messages that are likely but not definitely unwanted), thereby reducing the incidence of incorrectly excluding a desired message, while also enabling the user to triage the messages of the message queue in a rapid and easily understandable manner. Moreover, the use of distinctive visual styling may be combined with other techniques, including excluding definitely unwanted messages from the message queue (e.g., messages that are definitely unwanted are automatically moved to a "spam" folder, but messages that are likely but not definitely unwanted are included in the message queue but visually presented in a de-emphasized manner) to provide finer, more sophisticated granularity to the filtering of a message queue.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Within the field of computing, many scenarios involve the presentation to a user of messages in a message queue. As a first example, the user may receive email messages in a mailbox associated with an email address of the user, and may request the presentation of the mailbox through an email client or web browser. As a second example, the user may receive public or private messages in a web forum or other discussion scenario, and may wish to view the set of all messages directed to the user. As a third example, the user may have an identity in a chat environment, such as an instant messaging client or an Internet Relay Chat (IRC) room, and may receive and request to view a set of chat messages from other users.

Within these scenarios, some of the messages sent to the user may be unwanted. As a first example, bulk unsolicited email messages involving offers for products and services ("spam" email messages) are often generated and sent in great volume that presents a significant challenge to both users and administrators of email services. As a second example, some messages may present advertisements for goods or services that are illegal (e.g., prescription drugs or counterfeit goods), illegitimate (e.g., products that do not operate as advertised), or simply irrelevant to the user. As a third example, some messages may present material that is objectionable, such as mature content included in an email message presented to a young user. As a fourth example, some messages may attach or link to malicious content, such as maliciously crafted software that may damage the device operated by the user. As a fifth example, some messages may attempt to impersonate a trusted sender, such as an individual known to the user or a financial or academic institution patronized by the user, in order to exploit the trust of the user and extract sensitive information, such as passwords to secured accounts and bank account information.

Accordingly, many techniques have been devised to evaluate the content of messages in order to differentiate unwanted messages from desirable messages. As a first example, many spam filtering techniques have been devised that evaluate the content of the message in order to identify frequently used semantic patterns of content (e.g., keywords that are often used in bulk unsolicited email messages, such as the names of popular prescription drugs) in order to determine whether the user may consider a particular message to be desirable or unwanted. As a second example, various forms of whitelists (identifying trusted and verifiable senders) and/or blacklists (identifying disreputable senders of unwanted messages) may be utilized to differentiate messages based on the identities of the senders. As a third example, many authentication techniques are utilized to determine whether a particular message purportedly sent by a known sender (e.g., a well-known financial institution) was legitimately issued thereby or has been forged by an impersonator. As a fourth example, many security software suites are configured to examine content associated with a message, such as attached files and hyperlinks to objects that may be retrieved online, in order to identify and quarantine messages that reference dangerous content. As a fifth example, content control techniques may identify mature content presented in various messages (e.g., based on obscene or suggestive terms) and may censor messages that are not appropriate for the individual. Many sophisticated features of such techniques may be available (e.g., inferring filtering rules based on the actions of the user, and adaptive algorithms that develop and apply heuristics representing the interests and predictable behaviors of the individual).

These and other evaluation techniques may be applied to a message queue in order to partition messages based on the content therein. For example, when a device operated by the user receives a message, an automated process executing on the device may apply these techniques to determine whether the message is desired or unwanted, and may exclude unwanted messages from the message queue (e.g., by deleting the message, moving the message to a set of spam messages, or quarantining the message in order to block access to malicious content). The messages that do not appear to be unwanted may be presented to the user, e.g., as a message queue list comprising a set of rows for respective messages and a set of columns identifying respective properties of the messages, such as the name of the sender of the message, the date on which the message was sent, and the title of the message. In some scenarios, the user may be permitted to examine excluded messages in a separate partition (e.g., a separate "spam" folder), and may rescue messages that have been incorrectly identified as unwanted.

Figure 1:
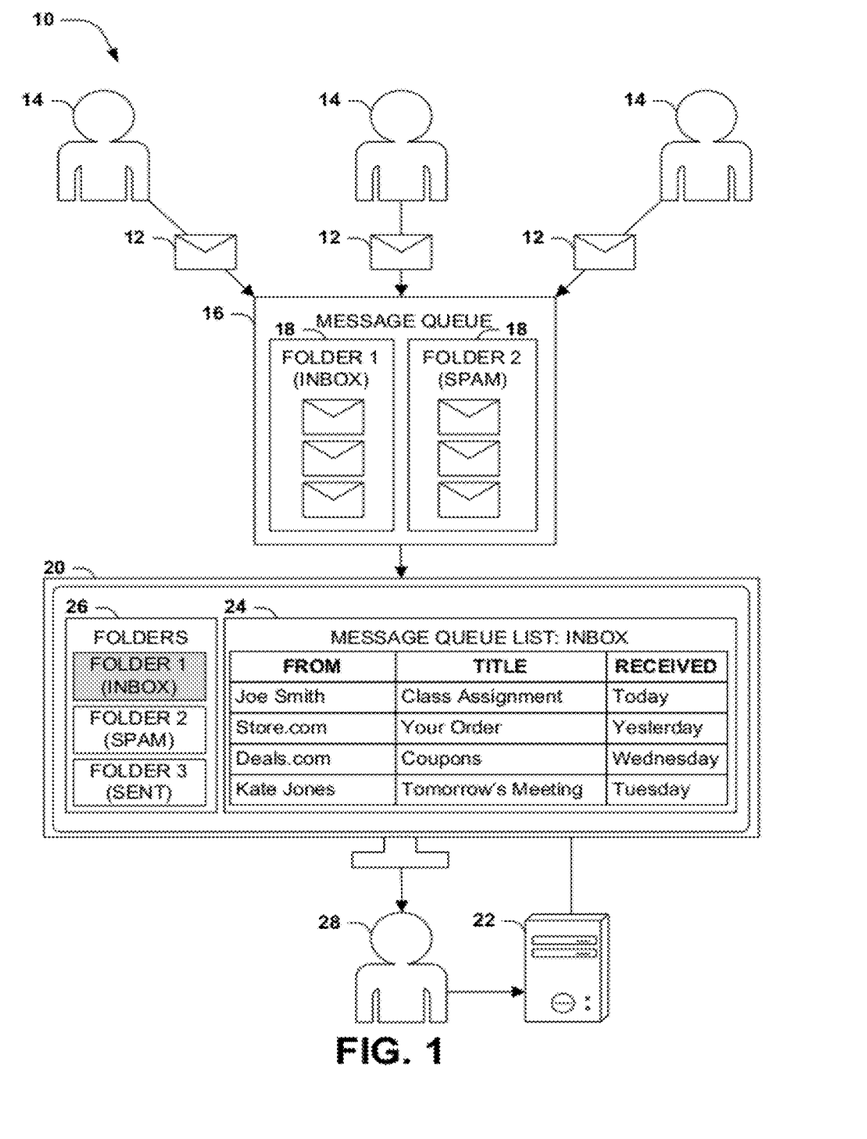
FIG. 1 is an illustration of an exemplary scenario featuring a presentation of a message queue to a user.

FIG. 1 presents an illustration of an exemplary scenario 10 featuring a presentation to a user 28 of a set of messages 12 comprising a message queue. In this exemplary scenario 10, the user 28 operates a device 22 having a display 20 and a message queue 16 that is configured to store a set of messages 12 sent by various senders 14. At the request of the user 28, the device 22 may present on the display 20 a message queue list 24, comprising the messages 12 and the properties thereof, such as the sender, title, and date of receipt of the message 12. Moreover, in this exemplary scenario 10, various evaluation techniques are utilized to differentiate desired messages 12 from unwanted messages 12, and such latter messages 12 may be automatically filtered into different folders 18, such as a first folder 18 representing an inbox of messages 12 that the user 28 may wish to view, and a second folder 18 comprising the messages 12 identified as unwanted. The user 28 may request the device 22 to display a message queue list 24 for a selected folder 18, and the device 22 may present on the display 20 a message queue list 24 comprising the messages 12 within the selected folder 18. Moreover, the user 28 may request to create new folders 18 for a particular category of mail (e.g., mail received from individuals who have entries in an address book of the user 28); may configure the device 22 to insert particular messages 12 to be delivered into a particular folder 18; and may manually move particular messages 12 from a first folder 18 to a second folder 18. The device may respond by fulfilling the requests, thereby enabling the user 28 to manage the message queue 16 in a desired manner.

While the exemplary scenario 10 of FIG. 1 presents some advantages, some disadvantages may also arise from the application of such techniques to the messages 12 of the message queue 16. As a first example, the filtering of borderline messages, which are unlikely to be desired by the user 28 but are not definitely unwanted, may pose a challenge for filtering techniques such as the exemplary scenario 10 of FIG. 1. For example, the evaluation techniques may incorrectly identify a message 12 as unwanted, such as messages 12 containing language that may be offensive to some individuals but not to the user 28, messages 12 containing offers for products or services that the user 28 has solicited or wishes to purchase, and messages 12 from a healthcare provider of the user 28 that legitimately references the name of a popular prescription pharmaceutical. The exclusion of such messages 12 from the message queue 16 may present a significant disadvantage to the user 28, and while semantic evaluation techniques have become steadily more sophisticated with ongoing development, such techniques are unlikely to achieve error-free evaluation. Conversely, a conservative filtering approach may deliver any message 12 that is not definitely unwanted to the message queue 16 of the user 28, but because such messages 18 are presented in an equivalent manner to legitimate messages 12, the user 28 may be unable to differentiate the messages 12 and may be exposed to unwanted messages 12. As a second example, messages 12 that are identified by the techniques as definitely desired by the user 28 (e.g., messages 12 sent from verified senders 14 who are identified in an address book of the user 28, and messages 12 containing keywords that are of high interest to the user 28) are presented in a similar manner to untrusted messages 12 that are of less or indeterminate interest to the user 28. While the user 28 may establish rules to triage such messages 12 (e.g., a rule indicating that all messages 12 sent by senders 14 to whom the user 28 has previously sent a message 12 are to be moved to a "trusted mail" folder 18), the involvement of the user 28 in developing such rules, as well as the presentation of such messages 12 in a separate message queue list 24 for a separate folder 18, may undesirably involve the attention and/or interaction of the user 28.

It may be observed that in the techniques utilized in the exemplary scenario 10 of FIG. 1, the decision of whether to present a message 12 to the user 28 or to exclude the message 12 from the message queue 16 represents a comparatively coarse-granularity decision, and that the coarseness of this granularity may be particularly relevant to messages of borderline desirability, which are either granted fully legitimate status and are presented in an equivalent manner as neutral and even highly desirable messages 12, or are entirely excluded from the message queue 16. The coarse granularity of these options may be improved by providing an intermediate option that does not fully exclude a borderline message 12 from the message queue 16, but that reduces the visibility of the borderline message 12 with respect to other messages 12. For example, the border message 12 may be presented in a visually de-emphasized manner in relation to other messages 12, such as a smaller or lighter-weight font; an attention-discouraging font, font color, or shading; or a smaller entry in the message queue list 24. Conversely, messages 12 that are likely of high interest to the user 28, such as messages 12 from family members and close relations of the user 28, may be presented in a visually emphasized manner with respect to other messages 12, such as a larger or heavier-weight font; an attention-attracting font, font color, or shading; or a larger entry in the message queue list 24. In this manner, messages 12 in the message queue list 24 may be visually distinguished from other messages 12 and the user 28 may readily identify and triage the messages 12 according to the trust categories 32 associated therewith. For example, utilizing the differentiating visual styles of the messages 12 in the message queue 16, the user 28 may choose to focus on only trusted messages 12, or may visually scan the message queue list 24 to identify a message 12 that has been inadvertently identified as suspicious. Such techniques may also be combined with other techniques for filtering the message queue 16 (e.g., definitely unwanted messages 12 may be automatically filtered out of the message queue 16 and to a "spam" folder, while merely suspicious messages 12 may remain in the message queue 16 but may be presented in the message queue list 24 in a visually de-emphasized manner).

The techniques presented herein enable a presentation of a message queue 16 to a user 28 in a manner that may reduce these and other disadvantages of other techniques for presenting a message queue 16 to a user 28. In accordance with the techniques presented herein, messages 12 within a message queue 16 may be identified as belonging to one of several trust categories 32 in a trust category set. For example, the trust category set may include a trusted message category comprising messages 12 that are likely to be trusted by the user 28, such as messages 12 sent from a sender 14 identified in the address book of the user 28, sent from a sender 14 that the user 28 has previously contacted, or that include one or more keywords of interest to the user 28; a suspicious message category comprising messages 12 that are likely to be unwanted by the user 28, such as messages 12 that include keywords that are often utilized in bulk unsolicited messages (e.g., the names of popular pharmaceuticals) but that may legitimately address such topics, and messages 12 that include content that may be objectionable to some users 28 but that may not be objectionable to the user 28; and an untrusted message category comprising the messages 12 of the message queue 16 that are neither trusted nor suspicious (e.g., an apparently innocuous message sent by an unknown or unidentified sender 14). Moreover, a visual style may be selected for the messages 12 of each trust category 32; e.g., a comparatively large, bolded, and brightly-colored visual style may be selected for the trusted message category, and a comparatively small, lightweight, and neutrally-colored visual style may be selected for suspicious messages; and an intermediate visual style may be selected for untrusted messages. When a request is received to present the message queue 16 to the user 28, a message queue list 24 may be generated and presented to the user 28, wherein each message 12 is presented according to the distinctive visual style of the trust category 32 of the message 12. In this manner, the visual presentation of the message queue list 24 may facilitate the user 28 in viewing the message queue 16 and triaging attention to respective messages 12 according to the trust categories 32 thereof.

Figure 2:
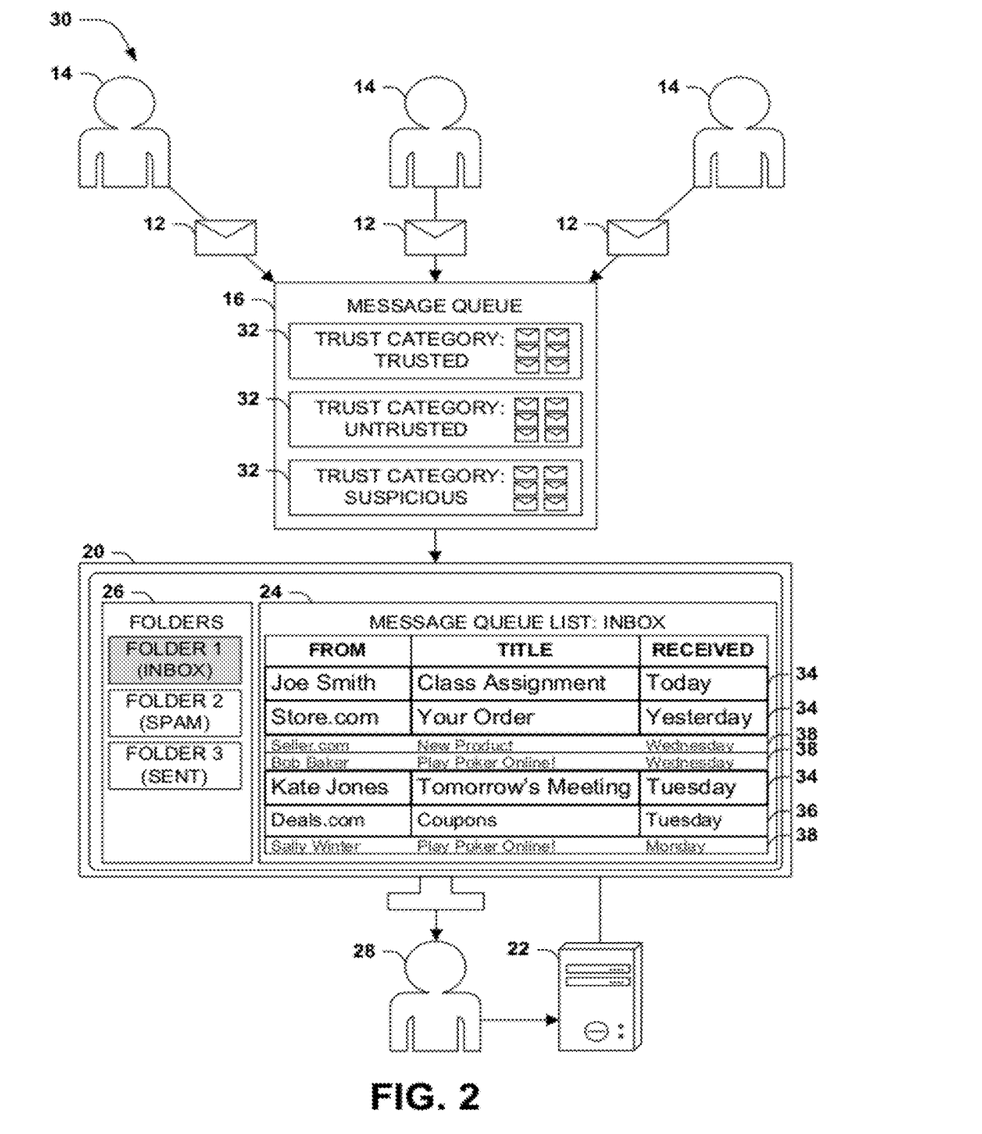
FIG. 2 is an illustration of an exemplary scenario featuring a presentation of a message queue to a user according to the techniques presented herein.

FIG. 2 presents an illustration of an exemplary scenario 30 featuring an application of the techniques presented herein to present a message queue 16 to a user 28 of a device 22. In this exemplary scenario 30, messages 12 sent from various senders 14 to the message queue 16 of the user 28, and are evaluated according to various techniques (e.g., verifying the identity of the sender 14, semantically evaluating the contents of the message 12, scanning attached and/or linked resources, and/or applying rules) in order to identify the desired or unwanted nature of the messages 12. In accordance with the techniques presented herein, a trust category 32 may be identified for each message 12 to indicate the results of the evaluation techniques. When the user 28 requests a presentation of the message queue 16, an embodiment of these techniques may generate and present to the user 28 (e.g., to be rendered on a display 20 of the device 22 of the user 28) a message queue list 24 that identifies the messages 12 in the message queue 16. Moreover, for respective messages 12 presented in the message queue list 24, a visual style 34 associated with the trust category 32 of the message 12 may be applied to the entry for the message 12 in the message queue list 24. For example, a first visual style 34 applied to a message 12 of a trusted message category may comprise a large font, a bolded border, and a taller entry for the message 12 in the message queue list 14; a second visual style 38 applied to a message of a suspicious message category may comprise a small font and a short and perhaps obscured entry in the message queue list 24; and a third visual style 38 may be applied to a message in an untrusted message category may comprise a neutral appearance in the selection of fonts and entries in the message queue list 24 that neither attracts nor repels the attention of the user 28. In this manner, the use of visual styles 34 in the presentation of the message queue list 24 to the user 28 may facilitate the user 28 in visually triaging the contents of the message queue 16 in accordance with the techniques presented herein.

Figure 3:
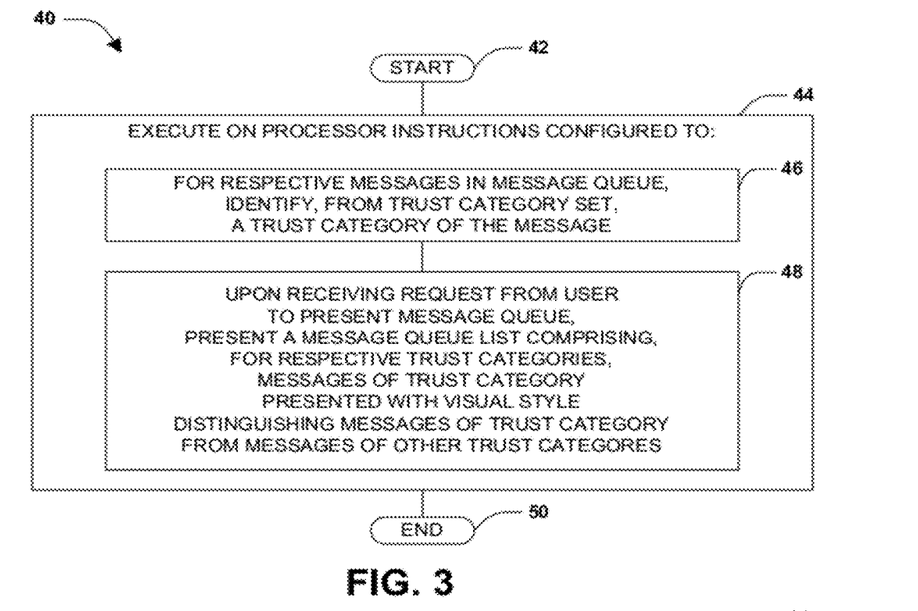
FIG. 3 is a flow chart illustrating an exemplary method of presenting a message queue to a user.

FIG. 3 presents a first embodiment of these techniques, illustrated as an exemplary method 40 of presenting to a user 28 a message queue 16 of messages 12. The exemplary method may be implemented, e.g., as instructions stored in a memory component of a device (e.g., a memory circuit, a platter of a hard disk drive, a solid-state storage device, or a magnetic or optical disc) that, when executed on a processor of the device, cause the device to apply the techniques presented herein. The exemplary method 40 begins at 42 and involves executing 44 the instructions on the processor of the device. In particular, the instructions involve, for respective messages 12 in the message queue 16, identifying 46, from a trust category set, a trust category 32 of the message 12. The instructions are also configured to, upon receiving a request from the user 28 to present the message queue 16, present 48 a message queue list 24 comprising, for respective trust categories 32, the messages 12 of the trust category 32 presented with a visual style 34 distinguishing the messages 12 of the trust category 32 from the messages 12 of other trust categories 32 of the trust category set. In this manner, the exemplary method 40 achieves the presentation of the message queue 16 according to the techniques presented herein, and so ends at 50.

Figure 4:
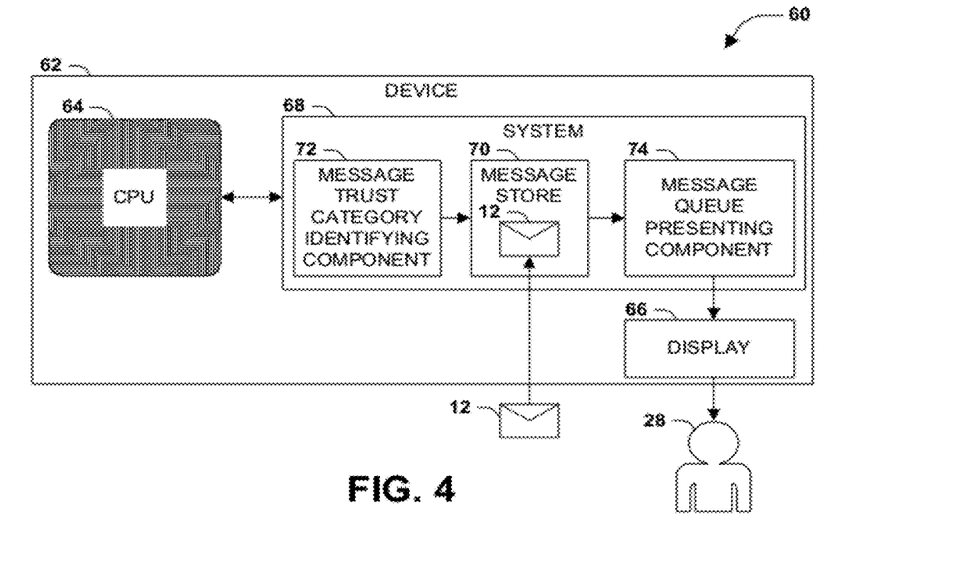
FIG. 4 is a component block diagram illustrating an exemplary system for presenting a message queue to a user.

FIG. 4 presents a second embodiment of these techniques, illustrated as an exemplary scenario 60 featuring an exemplary system 68 configured to present the messages 12 of a message queue 16 to a user 28. The exemplary system 68 may operate within a device 62 having a processor 64 and a display 66, and may be implemented, e.g., as a set of components that interoperate to utilize the resources of the device 62 in order to present the message queue 16 to the user 28. The exemplary system 68 may be implemented, e.g., as a software architecture, comprising a set of components respectively comprising instructions stored in a memory component of a device (e.g., a memory circuit, a platter of a hard disk drive, a solid-state storage device, or a magnetic or optical disc) that, when executed on a processor of the device, perform various tasks and/or interoperate with other components in order to apply the techniques presented herein. The exemplary system 68 includes a message store 70, which is configured to store the messages 12 of the message queue 16. The exemplary system 68 also includes a message trust category identifying component 72, which is configured to identify, for respected messages 12, a trust category 32 selected from a trust category set. The exemplary system 68 also includes a message queue presenting component 74, which is configured to, upon receiving a request from the user 28 to present the message queue 16, generate a message queue list 24 that comprises, for respective trust categories 32, the messages 12 of the trust category 32 presented with a visual style 34 that distinguishes the messages 12 of the trust category 32 from the messages 12 of other trust categories 34, and to present the message queue list 24 to the user 28 on the display 20 of the device 22. In this manner, the components of the exemplary system 68 interoperate to cause the device 62 to present the message queue 16 according to the techniques presented herein.

Still another embodiment involves a computer-readable medium comprising processor-executable instructions configured to apply the techniques presented herein. Such computer-readable media may include, e.g., computer-readable storage media involving a tangible device, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein. Such computer-readable media may also include (as a class of technologies that are distinct from computer-readable storage media) various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein.

Figure 5:
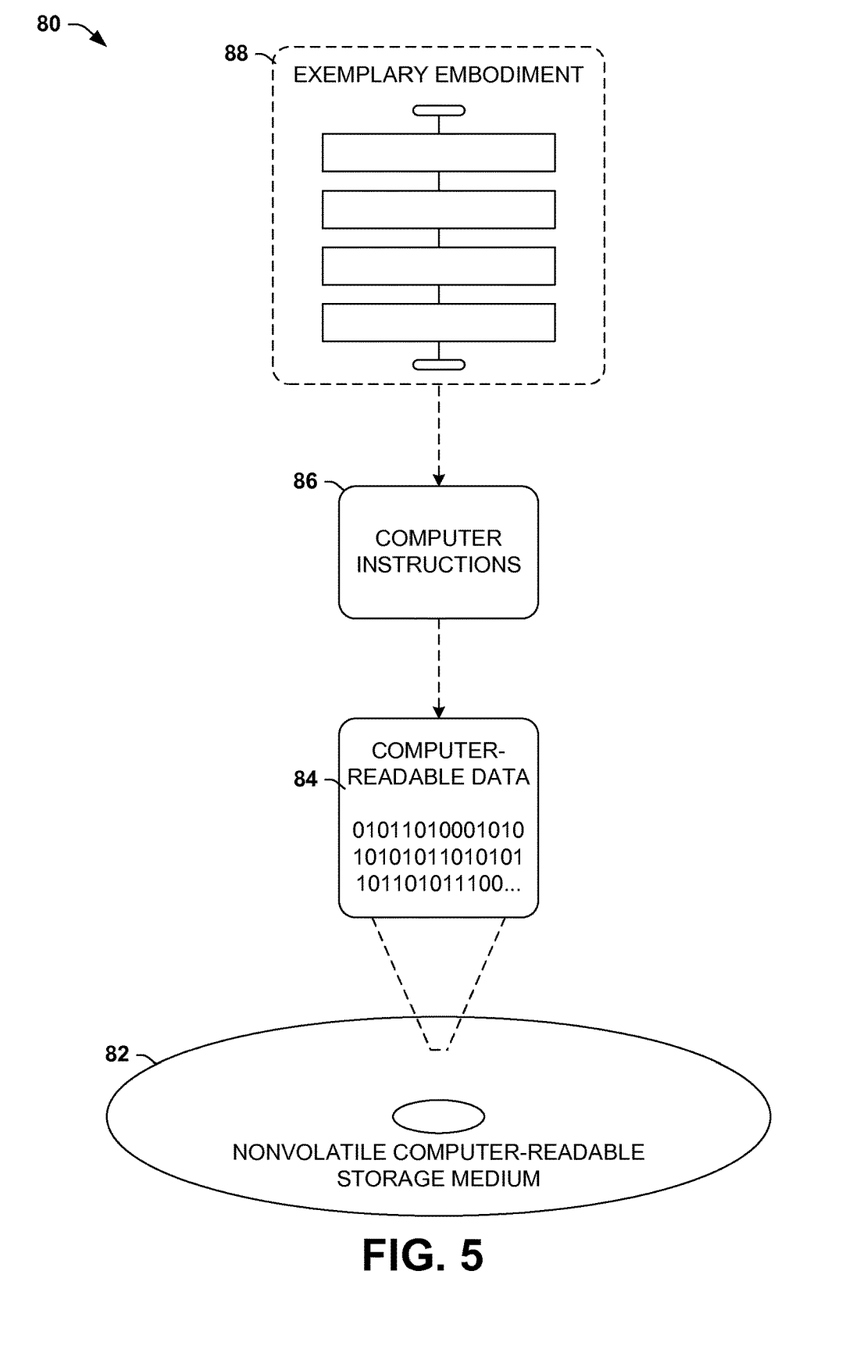
FIG. 5 is an illustration of an exemplary computer-readable medium comprising processor-executable instructions configured to embody one or more of the provisions set forth herein.

An exemplary computer-readable medium that may be devised in these ways is illustrated in FIG. 5, wherein the implementation 80 comprises a computer-readable medium 82 (e.g., a CD-R, DVD-R, or a platter of a hard disk drive), on which is encoded computer-readable data 84. This computer-readable data 84 in turn comprises a set of computer instructions 86 configured to operate according to the principles set forth herein. In one such embodiment, the processor-executable instructions 86 may be configured to perform a method of presenting a message queue to a user, such as the exemplary method 40 of FIG. 3. In another such embodiment, the processor-executable instructions 86 may be configured to implement a system for presenting a message queue to a user, such as the exemplary system 68 of FIG. 4. Some embodiments of this computer-readable medium may comprise a non-transitory computer-readable storage medium (e.g., a hard disk drive, an optical disc, or a flash memory device) that is configured to store processor-executable instructions configured in this manner. Many such computer-readable media may be devised by those of ordinary skill in the art that are configured to operate in accordance with the techniques presented herein.

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 40 of FIG. 3 and the exemplary system 68 of FIG. 4) to confer individual and/or synergistic advantages upon such embodiments.

A first aspect that may vary among embodiments of these techniques relates to the scenarios wherein such techniques may be utilized. As a first example, these techniques may be utilized to present various types of message queues 16 and messages 12, including email messages stored in an email mailbox; public and/or private messages 12 directed to the user 28 in a web forum; and chat messages 12 directed to the user 28 by other users 28 in a chat environment, such as an instant messaging environment. As a second example, the techniques may be implemented on a device 22 operated by the user 28, such as within an email client executing on a computer of the user 28 that may present the message queue 16 on a display 20 attached to the device 22, and/or on a device 22 presenting a service to the device 22 operated by the user 28, such as an email service that renders and sends to the device 22 of the user 28 a web page to be rendered within a browser on the display 20 of the device 22. Those of ordinary skill in the art may devise many scenarios wherein the techniques presented herein may be utilized.

A second aspect that may vary among embodiments of these techniques relates to the manner of identifying the trust categories 32 of respective messages 12 of the message queue 16. As a first example, an embodiment of these techniques may identify a trust category 32 upon receiving a message 12; may periodically examine the message queue 16 to identify the trust categories 32 of messages 12; and/or may perform a "just-in-time" identification of the trust categories 32 while preparing a presentation of the message queue list 24. Additionally, the identification of a trust category 32 of a message 12 may be stored (e.g., within the message queue 16 as metadata for respective messages 12), optionally with a reexamination if the logic involved in identifying trust categories 32 is subsequently updated, and/or may be re-identified for each message 12 included in a presentation of the message queue list 24.

As a second example of this second aspect, an embodiment of these techniques may utilize many evaluation techniques, including combinations thereof, to identify the trust categories 32 of respective messages 12. As a first variation, an embodiment may identify a trust category 32 of a message 12 by applying one or more trust heuristics. Such trust heuristics may be selected from a trust heuristic set, including a message sender trust heuristic (e.g., automatically associating with a particular trust category 32 messages 12 that originated from a particular sender 14); a message recipient trust heuristic (e.g., automatically associating with a particular trust category 32 messages 12 that are addressed to a particular recipient, such as a bulk message sent to many recipients vs. a message sent only to the user 28); a message delivery channel trust heuristic (e.g., automatically associating with a particular trust category 32 messages 12 that have been sent from email servers known to be reliable and/or unreliable); and a message content trust heuristic (e.g., automatically associating with a particular trust category 32 messages 12 that include particular keywords that suggest a higher level of trust and/or suspicion). Such techniques may be devised in a static manner, and/or in an adaptive manner, e.g., a learning algorithm such as a neural network or genetic algorithm that adaptively hones the logic used to identify trust categories 32 of messages 12.

As a second variation of this second example of this second aspect, the identification of trust categories 32 for respective messages 12 may involve a trust rule set, comprising one or more trust rules that specify the logic for such identification. For example, each trust rule may specify one or more trust rule criteria (e.g., a Boolean set of conditions that apply to messages 12 to be categorized according to the trust rule), as well as a trust category identified for the messages 12 satisfying the trust rule criteria. An embodiment of these techniques may identify the trust category 32 of a message 12 by identifying a trust rule having trust rule criteria that match the message 12, and selecting the trust category 32 of the trust rule. These trust rules may derive from many sources. For example, one or more trust rules may be defined by an administrator of the message queue 16, the device 22 operated by the user 28 (e.g., an email client installed on the device 22), and/or a service provided to the device 22 (e.g., an email service accessed by the device 22); may be received from a trust rule source (e.g., a provider of a whitelist identifying trusted senders 14 and/or a blacklist identifying suspicious senders 14). Custom trust rules may also be specified from the user 28 (e.g., specified as one or more trust rule criteria and a trust category) and added to the trust rule set.

Figure 6:
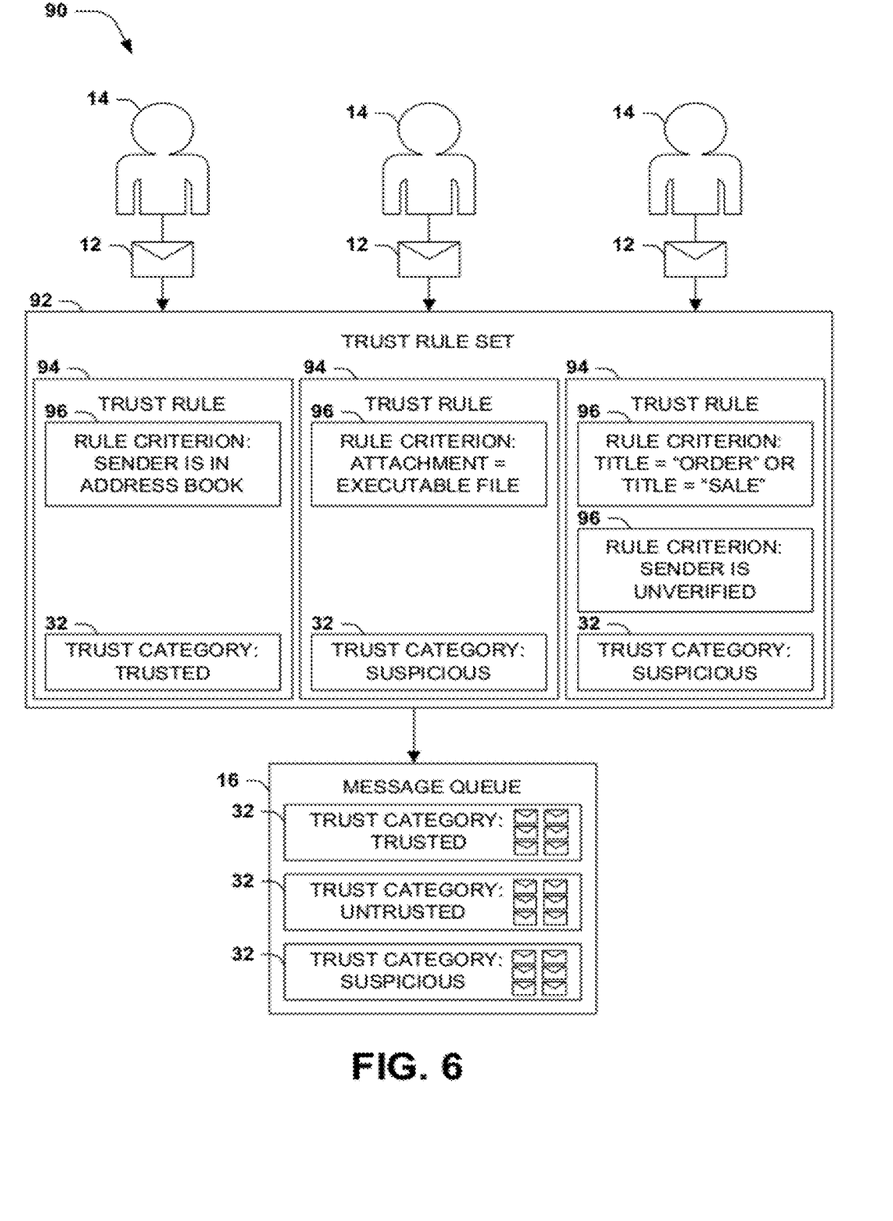
FIG. 6 is an illustration of an exemplary scenario featuring an application of a trust rule set to the messages of a message queue.

FIG. 6 presents an illustration of an exemplary scenario 90 featuring a trust rule set 92, comprising a set of trust rules 92 respectively having at least one trust rule criterion 96 and a trust category 98. For example, a first trust rule 94 may specify a trust rule criterion 96 indicating that the sender 14 of a message 12 is identified in an address book of the user 28, and indicating that messages 12 satisfying this trust rule criterion 96 are to be assigned to a trusted message category, while a second trust rule 94 may specify a trust rule criterion 96 indicating that the message 12 attaches an executable file, and indicating that messages 12 satisfying this trust rule criterion 96 are to be assigned to a suspicious message category. Upon receiving a message 12 from a sender 14, an embodiment of these techniques may compare the trust rule criteria 96 of respective trust rules 94 to the corresponding properties of the message 12, and, upon identifying a trust rule 94 where all of the trust rule criteria 96 match the message 12, may identify the message 12 in the message queue 16 with the trust category 32 identified by the trust rule 94.

As a third example of this second aspect, an embodiment of these techniques may monitor and evaluate user actions of the user 28 in order to determine the logic of identifying trust categories 32 of respective messages 12. As a first such example, one or more inferred trust rules may be automatically generated by monitoring various user actions with the messages 12 of the message queue 16 (e.g., the types of messages 12 that the user 28 reads, to which the user replies, and/or that the user 28 moves to a folder 18 within the message queue 16) and added to the trust set. As a second such example, inaction and/or inattention of the user 28 may also serve as an indicator of the logic used to identify trust categories 32 of respective messages 12 and/or filter the messages 12. For example, the message queue 16 may include a message 12 identified as belonging to a suspicious message category. The message 12 may therefore be presented in the message queue list 24 according to a visual style that de-emphasizes the suspicious message 12. If the user 28 then fails to interact with the suspicious message 12 (e.g., if the user 28 does not choose to read the suspicious message 12 for a particular period of time or in response to several presentations of the suspicious message 12 in the message queue list 24), the suspicious nature of the message 12 may be implicitly confirmed, and the suspicious message 12 may be removed from the message queue 16. Those of ordinary skill in the art may devise and utilize many ways of identifying the trust categories 32 of the messages 12 in accordance with the techniques presented herein.

A third aspect that may vary among embodiments of these techniques involves the types of visual styles 34 that may be applied to the messages 12 of respective trust categories 32 in a presentation of the message queue list 24 to the user 28. As a first example, a visual style may include many visual aspects to distinguish the messages 12 of respective trust categories 32 in the presentation. For example, a visual style set may include many such visual aspects of each visual style, such as a distinctive font, a distinctive font weight, a distinctive font size, a distinctive font color, a distinctive shading color or style of an entry of the message 12 in the message queue list 24, a distinctive icon used to depict the message 12 in the message queue list 24, a distinctive border of the message 12 in the message queue list 24, and/or a distinctive layout, such as a horizontal or vertical positioning of the message 12 within the message queue list 24. As a second example of this third aspect, the user 28 may select a selected visual style to identify and distinguish the messages 12 of a particular trust category 32, and the selected visual style may be utilized in the presentation of the message queue list 24 to the user 28. As a third example of this third aspect, the trust category set may include a trusted message category 32 having a visual style 34 that emphasizes the messages 12 of the trusted message category 32 (e.g., utilizing a larger font, a thicker border, and/or a brighter or more noticeable font color), and/or a suspicious message category 32 having a visual style 34 that de-emphasizes the messages 12 of the suspicious message category 32 (e.g., utilizing a smaller font, a thinner or invisible border, and/or a more neutral or less noticeable font color). Alternatively, the trust categories 32 may of the trust category set may representing a trust gradient (e.g., a range of trust categories representing many grades of trust), and respective trust categories 32 may have a visual style 34 indicating a position of the trust category within the trust gradient (e.g., incrementally brighter bright colors and/or larger fonts indicating the inclusion of a message 12 in trust categories 32 representing incrementally greater trust levels).

As a fourth example of this third aspect, the user 28 may customize the trust categories 32, and the visual styles 34 assigned thereto may be accordingly adjusted. As a first such example, the user 28 may specify a trust subcategory of a trust category 32 (e.g., a subset of messages 12 identified within the trust category 32 having a shared property), and an embodiment of these techniques may add the trust subcategory to the trust subcategory set with a particular visual style 34. Moreover, the visual style 34 selected for the trust subcategory may comprise a visual substyle of a visual style 34 assigned to the trust category 32. For example, a first set of visual traits may be applied to the presentation of all messages 12 within a particular trust category 32, but a second set of visual traits may be additionally applied to further distinguish the messages 12 of a trust subcategory within the trust category 32 from the other messages 12 of the trust category 32.

Figure 7:
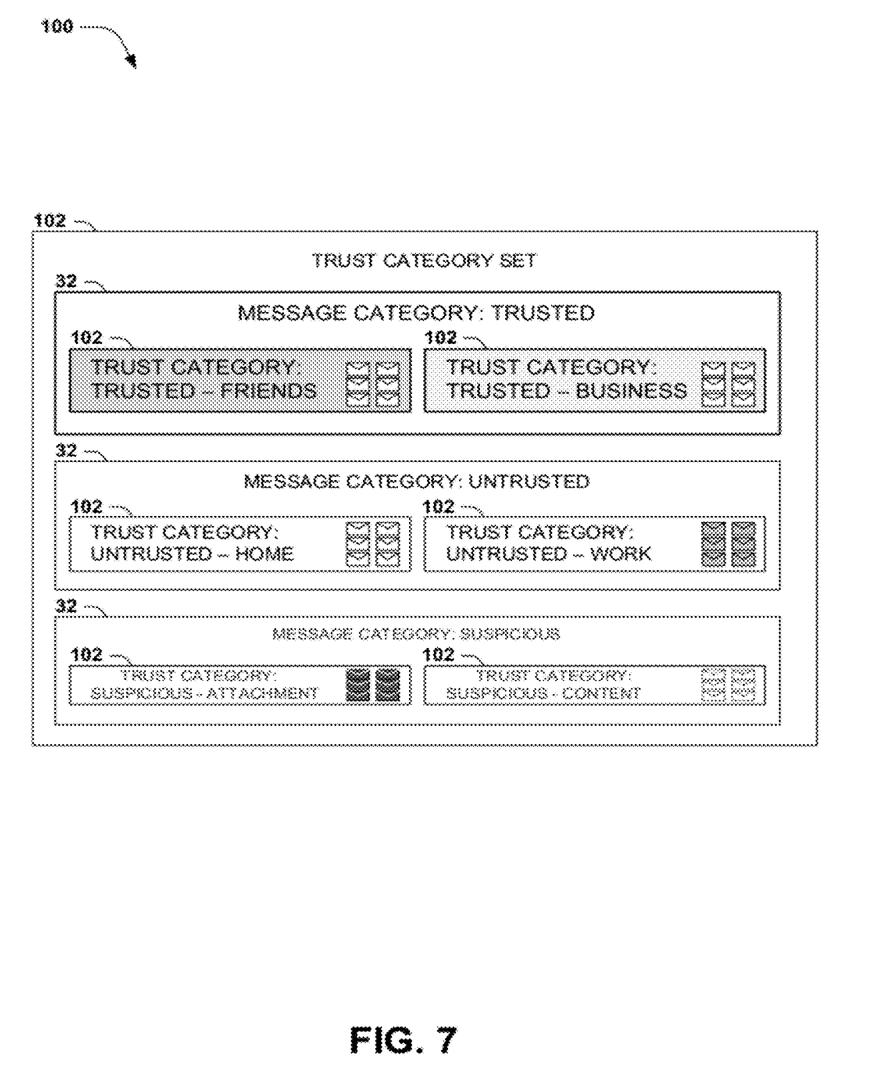
FIG. 7 is an illustration of an exemplary scenario featuring visual substyles applied to trust subcategories of respective trust categories.

FIG. 7 presents an illustration of an exemplary scenario 100 featuring the selection of visual substyles for respective trust subcategories 102 within respective trust categories 32. In this exemplary scenario 100, a trust category set 102 comprises three trust categories 32, including a trusted message category, an untrusted message category, and a suspicious message category. Within each trust category 32, two trust subcategories 102 are defined that further identify the trust level of messages 12 assigned thereto; e.g., the trusted message category includes a first trust subcategory 102 for messages 12 from friends, and a second trust subcategory 102 for messages from verified business with whom the user 28 often transacts. Each trust category 32 is depicted according to a distinguishing visual style 34; e.g., the visual style 34 of the trusted message category includes a larger font and a taller entry in the message queue list 24, while the visual style 34 of the suspicious message category includes a smaller font and a shorter entry in the message queue list 24. Moreover, the visual categories 102 within each trust category 32 also include the visual traits of the visual style, but also includes a visual substyle that applies additional visual traits. For example, messages 12 within a first trust subcategory 102 of the first trust category 32 may be presented, in addition to the large font and the tall entry according to the first visual style, with a first visual substyle comprising a first distinguishing shading of the entry, while a second trust subcategory 102 of the first trust category 32 may be presented with a second visual substyle comprising a second distinguishing shading of the entry. The application of visual substyles of the trust subcategories 102 in a supplemental manner with the visual styles 34 of the trust categories 32 may enable the user 28 to identify both the trust categories 32 and the trust subcategories 102 of respective messages 12 through a cursory visual inspection of the message queue list 24. Those of ordinary skill in the art may devise many types of visual styles 34 to distinguish the trust categories 32 of respective messages 12 within a presentation of the message queue list 24 in accordance with the techniques presented herein.

A fourth aspect that may vary among embodiments of these techniques relates to the presentation of the message queue list 24. As a first example, the message queue list may include one more message queue list views that alter the presentation of the message queue 24 in various ways, such as a filter that presents only the messages 12 of the message queue 24 matching particular filter criteria (e.g., "show only messages sent within the last week," and "show only messages having attachments"). Upon the user 28 selecting a particular message queue list view, an embodiment of these techniques may apply the selected message queue list view to the message queue list 24. As a second example of this fourth aspect, various types of groupings may be applied to the messages 14 of the message queue list 24; e.g., the messages may be grouped according to the trust categories 102 or other properties, such as sender, date, or topic, or attachment status. As a third example of this fourth aspect, the message queue list 24 may include options for applying various types of message actions to one or more messages 12 of the message queue list 24 (e.g., "mark all selected messages as read," or "move all suspicious messages to the spam folder"), and an embodiment may, upon receiving from the user 28 a selection of a message action, apply the selected message action to the selected messages 12 of the message queue list 24.

As a fourth example of this fourth aspect, the message queue list 24 may be presented with the messages 12 sorted according to a particular sort order, such as sorting in ascending or descending order by date of sending or receipt, the name of the sender 14, the subject or length of the message 12, or a general priority score indicating the predicted interest level and/or urgency with which the user 28 regards the message 12. The sort order may be achieved, e.g., by identifying a position in the message queue 16 of respective messages 12 according to the sort order, and then sorting the message queue list 24 according to the positions of the messages 12. The sort order may also be utilized to improve the presentation of the message queue list 24. As one example, a suspicious message 12 may initially be presented at a particular position according to the sort order, but if the user 28 does not interact with the suspicious message 12, the position of the suspicious message 12 within the message queue list 24 may degrade over time until the suspicious message 12 is removed from the message queue list 24. For example, an embodiment of these techniques may periodically reduce the positions of suspicious messages 12 (e.g., making the suspicious messages 12 appear incrementally lower in successive presentations of the message queue list 24), and when a suspicious message 12 reaches a removal position (e.g., the lowest entry in the message queue list 24), the embodiment may remove the suspicious message 14 from the message queue 16. In this manner, the message queue 16 may exhibit a self-cleaning quality, such that suspicious messages 12 are initially presented to the user 12 (thereby reducing the incidence of false positives), but are steadily removed without involving the attention or interaction of the user 12.

Figure 8:
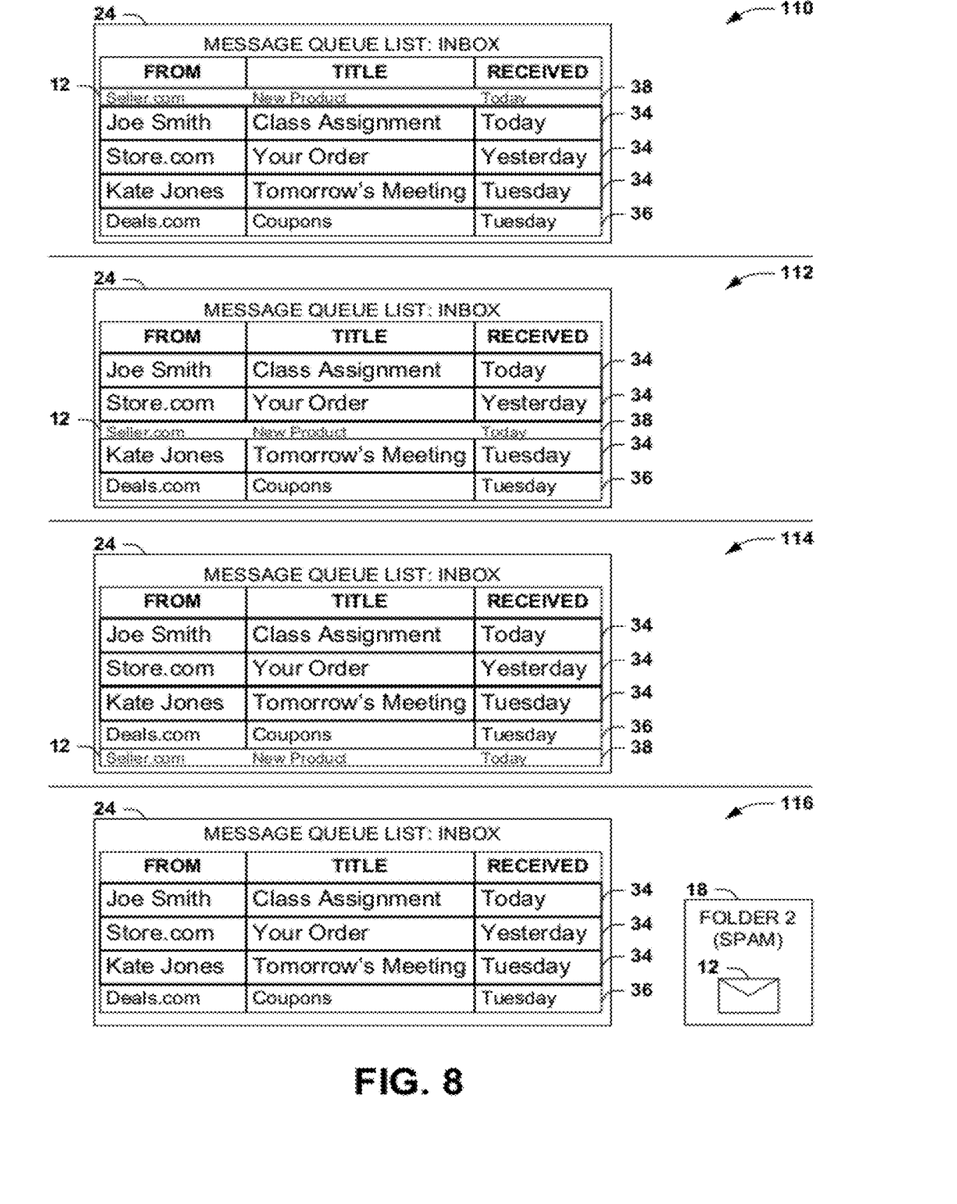
FIG. 8 is an illustration of an exemplary scenario featuring an automatic removal of a suspicious message from a message queue.

FIG. 8 presents an illustration of an exemplary scenario featuring an incremental self-cleaning of a message queue list 24 that does not involve the interaction of the user 28. In this exemplary scenario, a message queue list 24 is presented that includes various messages 12 presented with visual styles that distinguish the messages 12 as identified with various trust categories 32. The message queue list 24 also applies a sort order involving a descending date of receipt of the messages 12. Within this exemplary scenario, and as illustrated at a first time point 110, the top message 12 is identified as a suspicious message (depicted according to a second visual style 38 including a small font, a reduced border, and a short entry within the message queue list 24), and is initially sorted into the message queue list 24 according to its position in the sort order. However, by a second time point 112, the user 28 has not interacted with the suspicious message 12, and the position of the suspicious message 12 is reduced in the message queue list 24, and the suspicious message 12 now appears below its position in the sort order. As the user 28 continues to not interact with the suspicious message 12, its position in the message queue list 24 may be further degraded at a third time point 114; and at a fourth time point 116, the position of the suspicious message 12 may be so far reduced (e.g., no longer appearing in the first page of messages 12 in a multi-page presentation of the message queue list 24) that the suspicious message 12 is removed from the message queue 16, and is placed instead in a folder 18 for unwanted messages. In this manner, the message queue list 24 may present a self-cleaning feature, wherein suspicious messages 12 are temporarily presented (thereby reducing a removal of the message 12 due to a false positive of the evaluation techniques), but may be removed from the message queue 16 without the intervention of the user 28. Those of ordinary skill in the art may devise many ways of presenting the message queue list 24 in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 9:
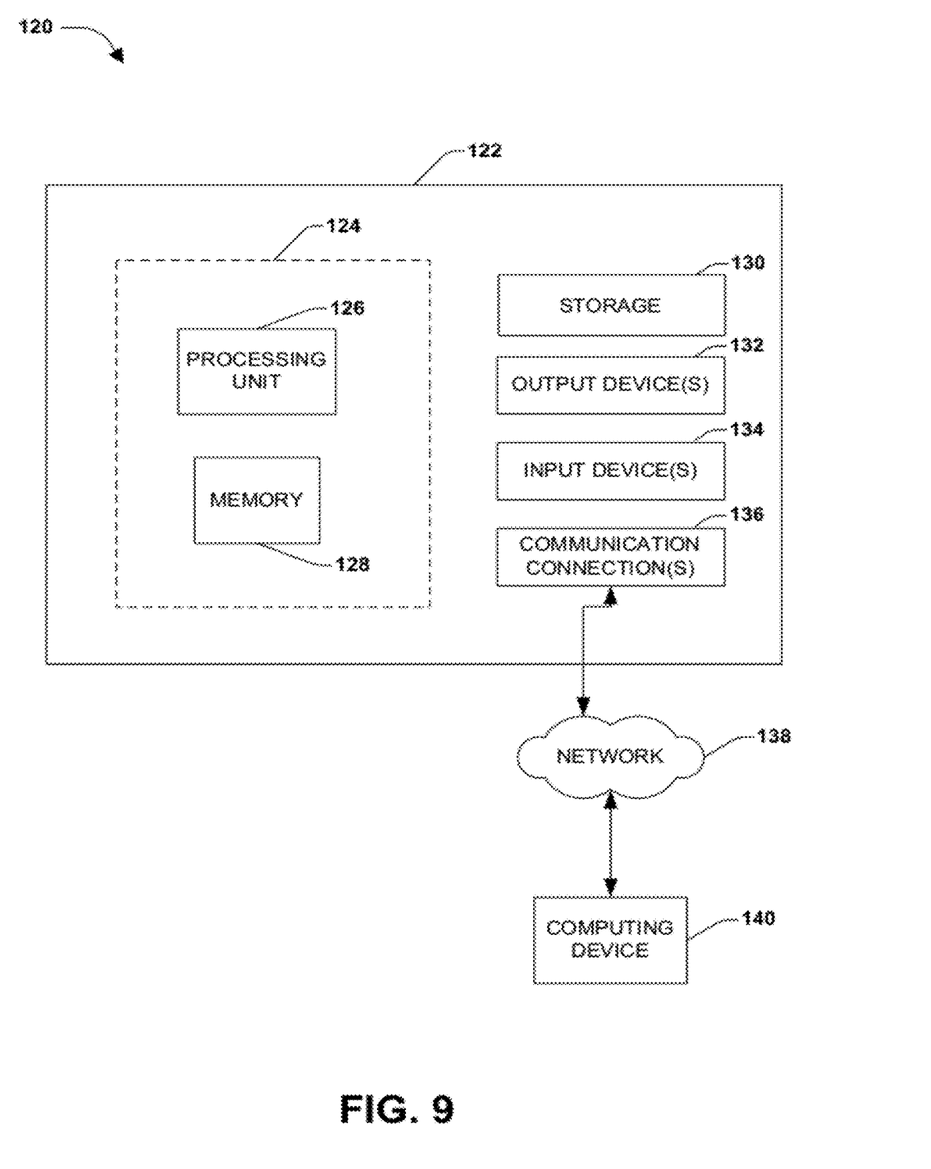
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 120 comprising a computing device 122 configured to implement one or more embodiments provided herein. In one configuration, computing device 122 includes at least one processing unit 126 and memory 128. Depending on the exact configuration and type of computing device, memory 128 may be volatile (such as RAM, for example), non-volatile (such as ROM, flash memory, etc., for example) or some combination of the two. This configuration is illustrated in FIG. 9 by dashed line 124.

In other embodiments, device 122 may include additional features and/or functionality. For example, device 122 may also include additional storage (e.g., removable and/or non-removable) including, but not limited to, magnetic storage, optical storage, and the like. Such additional storage is illustrated in FIG. 9 by storage 130. In one embodiment, computer readable instructions to implement one or more embodiments provided herein may be in storage 130. Storage 130 may also store other computer readable instructions to implement an operating system, an application program, and the like. Computer readable instructions may be loaded in memory 128 for execution by processing unit 126, for example.

The term "computer readable media" as used herein includes computer storage media. Computer storage media includes volatile and nonvolatile, removable and non-removable media implemented in any method or technology for storage of information such as computer readable instructions or other data. Memory 128 and storage 130 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 122. Any such computer storage media may be part of device 122.

Device 122 may also include communication connection(s) 136 that allows device 122 to communicate with other devices. Communication connection(s) 136 may include, but is not limited to, a modem, a Network Interface Card (NIC), an integrated network interface, a radio frequency transmitter/receiver, an infrared port, a USB connection, or other interfaces for connecting computing device 122 to other computing devices. Communication connection (s) 136 may include a wired connection or a wireless connection. Communication connection(s) 136 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 122 may include input device(s) 134 such as keyboard, mouse, pen, voice input device, touch input device, infrared cameras, video input devices, and/or any other input device. Output device(s) 132 such as one or more displays, speakers, printers, and/or any other output device may also be included in device 122. Input device(s) 134 and output device(s) 132 may be connected to device 122 via a wired connection, wireless connection, or any combination thereof. In one embodiment, an input device or an output device from another computing device may be used as input device(s) 134 or output device(s) 132 for computing device 122.

Components of computing device 122 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 122 may be interconnected by a network. For example, memory 128 may be comprised of multiple physical memory units located in different physical locations interconnected by a network.

Those skilled in the art will realize that storage devices utilized to store computer readable instructions may be distributed across a network. For example, a computing device 140 accessible via network 138 may store computer readable instructions to implement one or more embodiments provided herein. Computing device 122 may access computing device 140 and download a part or all of the computer readable instructions for execution. Alternatively, computing device 122 may download pieces of the computer readable instructions, as needed, or some instructions may be executed at computing device 122 and some at computing device 140.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of presenting to a user a message queue of messages, the method performed on a device having a processor and comprising:
executing on the processor instructions configured to:
identify a trust category of a first message of the message queue;
present the messages of the message queue sorted according to a sort order, wherein the messages of the message queue are presented at first relative positions with respect to one another in accordance with the sort order; and
detecting interactions of the user with the messages of the message queue;
upon detecting that the user has not interacted with the first message for a given time period, change the position of the first message in the message queue from a first position with respect to a second message to a second position with respect to the second message, while continuing to present a plurality of other messages of the message queue at the first relative positions with respect to one another in accordance with the sort order,
wherein the first position of the first message with respect to the second message is in accordance with the sort order, and wherein the second position of the first message with respect to the second message is contrary to the sort order.

2. The method of claim 1, wherein identifying a trust category of the first message comprises: applying to the first message at least one trust heuristic selected from a trust heuristic set comprising:
a message sender trust heuristic;
a message recipient trust heuristic;
a message delivery channel trust heuristic; and
a message content trust heuristic.

3. The method of claim 1:
the device comprising a trust rule set comprising at least one trust rule comprising:
at least one trust rule criterion, and
a trust category of messages satisfying the at least one trust rule criterion; and
wherein identifying the trust category of the first message comprises:
identifying at least one trust rule comprising trust rule criteria matching the first message, and
selecting the trust category of the trust rule for the first message.

4. The method of claim 3, the instructions configured to, upon receiving from the user a custom trust rule specifying at least one trust rule criterion and a trust category, add the custom trust rule to the trust rule set.

5. The method of claim 3, the instructions configured to:
monitor user actions of the user with the messages of the message queue;
based on the user actions of the user, infer at least one inferred trust rule comprising at least one trust rule criterion and a trust category; and
add the inferred trust rule to the trust rule set.

6. The method of claim 1:
at least one trust category comprising a suspicious message category;
the message queue comprising at least one at least one suspicious message in the suspicious message category; and
the instructions configured to, upon the user failing to interact with a suspicious message presented in the message queue list, remove the suspicious message from the message queue.

7. The method of claim 1, the trust categories comprising:
a trusted message category having a visual style that emphasizes the messages of the trusted message category with respect to other messages in the message queue; and
a suspicious message category having a visual style that de-emphasizes the messages of the suspicious message category with respect to other messages in the message queue.

8. The method of claim 1:
the trust categories of the trust category set representing a trust gradient; and
respective trust categories of the trust category set having a visual style indicating a position of the trust category within the trust gradient.

9. The method of claim 1, the instructions configured to, upon receiving from the user a trust subcategory of a trust category:
select a visual style for the trust subcategory, and
add the trust subcategory to the trust category set.

10. The method of claim 1:
the device comprising at least one message queue list view specifying at least one presentation aspect of the message queue; and
the instructions configured to, upon receiving from the user a selection of a selected message queue list view, apply the at least one presentation aspect of the selected message queue list view to the presented message queue.

11. The method of claim 1, the instructions configured to, upon receiving from the user a message action to be applied to the messages of at least one selected trust category, apply the message action to the messages of the at least one selected trust category in the message queue.

12. The method of claim 1, wherein changing the position of the first message further comprises: periodically moving the first message to a new position in the message queue that is incrementally lower in the sort order with respect to the position of the second message, while continuing to present the plurality of other messages of the message queue at the first relative positions with respect to one another in accordance with the sort order.

13. The method of claim 12, wherein changing the position of the first message further comprises: upon changing the position of the first message to a removal position, removing the first message from the message queue.

14. The method of claim 1, wherein changing a trust category of the first message further comprises: detecting an absence of interaction of the user with the first message for an interaction period exceeding an interaction duration.

15. A system configured to present, to a user of a device having a display and a processor, a message queue comprising two or more messages, the system comprising:
a message trust category identifying memory storing instructions that, when executed on the processor, cause the device to:
identify a trust category of a first message of the message queue; and a message queue presenting memory storing instructions that, when executed on the processor, cause the device to:
  present the messages of the message queue to the user on the display of the device sorted according to a sort order, wherein the messages of the message queue are presented at first relative positions with respect to one another in accordance with the sort order;
  detect interactions of the user with the messages of the message queue;
  upon detecting that the user has not interacted with the first message for a given time period, change the position of the first message in the message queue from a first position with respect to a second message to a second position with respect to the second message, while continuing to present a plurality of other messages of the message queue at the first relative positions with respect to one another in accordance with the sort order,
  wherein the first position of the first message with respect to the second message is in accordance with the sort order, and wherein the second position of the first message with respect to the second message is contrary to the sort order.

16. The system of claim 15, the message queue presenting component further configured to, for respective suspicious messages associated with a suspicious message category, upon detecting an absence of a user interaction of the user with a suspicious message presented in the message queue, periodically reduce the position of the suspicious message in the sort order with respect to the second message.

17. The system of claim 16, the message queue presenting component further configured to, upon the reducing the position of the suspicious message to a removal position, remove the suspicious message from the message queue.

18. A nonvolatile computer-readable storage device storing instructions that, when executed on a processor of a device, cause the device to present message queues of messages to users by:
  identifying a trust category of a first message of the message queue; and
  presenting the messages of the message queue according to a sort order, wherein the messages of the message queue are presented at first relative positions with respect to one another in accordance with the sort order; and
  detecting interactions of the user with the messages of the message queue;
  upon detecting that the user has not interacted with the first message for a given time period, the first message that is presented at a first position in the message queue with respect to a second position of a second message of the message queue and according to the sort order, change the position of the first message from the first position to a second position with respect to the second message, while continuing to present a plurality of other messages of the message queue at the first relative positions with respect to one another in accordance with the sort order,
  wherein the first position of the first message with respect to the second message is in accordance with the sort order, and wherein the second position of the first message with respect to the second message is contrary to the sort order.

19. The nonvolatile computer-readable storage device of claim 18, wherein changing the position of the first message in the message queue from the first position to the second position further comprises: periodically moving the first message to a new position in the message queue that is incrementally lower in the sort order with respect to the position of the second message, while continuing to present the plurality of other messages of the message queue at the first relative positions with respect to one another in accordance with the sort order.

20. The nonvolatile computer-readable storage device of claim 19, wherein the instructions further cause the device to, upon the reducing the position of the first message to a removal position, remove the suspicious first message from the message queue.

* * * * *